United States Patent
Betzitza et al.

(12) 
(10) Patent No.: US 6,265,968 B1
(45) Date of Patent: Jul. 24, 2001

(54) VEHICLE WITH OBJECT DETECTION DEVICE

(75) Inventors: Peter Betzitza, Sindelfingen; Guenter Dobler, Altbach; Siegfried Rothe, Denkendorf, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/249,809

(22) Filed: Feb. 16, 1999

(30) Foreign Application Priority Data

Feb. 14, 1998 (DE) ............................................. 198 06 150

(51) Int. Cl.$^7$ .................................. B60Q 1/00; G08G 1/16
(52) U.S. Cl. ......................... 340/436; 340/435; 340/903; 340/555; 180/167; 180/169
(58) Field of Search .................................. 340/435, 436, 340/903, 555; 180/167, 169

(56) References Cited

U.S. PATENT DOCUMENTS

| | | | |
|---|---|---|---|
| 4,926,170 | * 5/1990 | Beggs et al. | 340/904 |
| 5,173,881 | * 12/1992 | Sindle | 367/909 |
| 5,249,157 | * 9/1993 | Taylor | 340/903 |
| 5,463,384 | * 10/1995 | Juds | 340/903 |
| 5,475,494 | * 12/1995 | Nishida et al. | 340/435 |
| 5,675,326 | * 10/1997 | Juds et al. | 340/903 |

FOREIGN PATENT DOCUMENTS

| | | |
|---|---|---|
| 37 28 948 A1 | 1/1989 | (DE) . |
| 195 07 957 C1 | 7/1996 | (DE) . |
| 38 13 083 C3 | 9/1996 | (DE) . |
| 0305 907 | 3/1989 | (EP) . |
| 0736 414 | 10/1996 | (EP) . |
| 2 131 642 | 6/1984 | (GB) . |
| 3-125985 | 5/1991 | (JP) . |
| 4-58179 | 2/1992 | (JP) . |

\* cited by examiner

*Primary Examiner*—Donnie L. Crosland
(74) *Attorney, Agent, or Firm*—Evenson, McKeown, Edwards & Lenahan, P.L.L.C.

(57) ABSTRACT

An object detection device for detecting objects in a rear lateral area of a vehicle includes zero-contact radiation-based scanners for scanning such area, and an evaluation unit connected to the scanners. According to the invention, the evaluation unit evaluates the time sequence of the scanning information from two or more strip-shaped portions of the area under observation, with horizontal components that are differently inclined to the lengthwise direction of the vehicle or are offset from one another in the lengthwise direction of the vehicle. The evaluation unit distinguishes objects moving in the travel direction of the vehicle from standing and oncoming objects, based on the response sequence for the portion under observation.

4 Claims, 6 Drawing Sheets

VEHICLE WITH OBJECT DETECTION DEVICE

BACKGROUND AND SUMMARY OF THE INVENTION

This application claims the priority of German patent document 198 06 150.1, filed Feb. 14, 1998, the disclosure of which is expressly incorporated by reference herein.

The invention relates to a vehicle with a device for detecting objects in an area having a specified horizontal extent, by means of radiation-based scanning of the area and an obstacle evaluation unit.

Various kinds of such vehicles are known, in which the object detection device can be used to detect other vehicles in the so-called blind spot (the side area behind the vehicle which is difficult for the driver to see, especially the left rear side area), or to detect the pattern of road markings, standing objects (especially other vehicles) and parking spaces between standing objects, and to determine their size, or for another, similar purpose. Optical systems, such as infrared scanning systems or video cameras as well as acoustic systems, such as sound and radar systems are used for zero-contact radiation-based scanning of an area under observation. Object detection devices as aids for parking are described for example in German patent documents DE-OS 37 28 948 A1 and DE 38 13 083 C3. German patent document DE 195 07 957 C1 discloses a vehicle with a laterally mounted optical scanning device in the form of an infrared scanning system that serves to detect lane boundaries. Additional optical scanning devices are optionally provided on the other sides of the vehicle to provide bilateral or omnilateral monitoring of the surroundings to detect objects which may be located therein.

One object of the present invention is to provide a vehicle of the type described above at the outset in which the area under observation can be monitored reliably at relatively low expense for objects that might appear.

Another object of the invention is to provide such a system which can distinguish between detected objects with regard to their direction of motion relative to the direction of motion of the vehicle. The object detection device thus employed can be used flexibly for other applications if necessary.

These and other objects and advantages are achieved by the object detection device according to the invention, in which an evaluation unit evaluates the scanning information from two or more strip-shaped portions of the area under observation that have horizontal components which are differently inclined relative to the lengthwise direction of the vehicle, or are offset in the lengthwise direction of the vehicle with time resolution. When an object appears, the unit distinguishes between objects that are moving in the direction of travel of the vehicle and objects that are at rest or oncoming, based on the sequence of responses from the portions under observation. Any conventional scanning system based on electromagnetic radiation or acoustic waves can be used as the scanning means in the object detection device. In particular, infrared, radar, and ultrasound systems can be used, with individual direction-specific scanning elements which cover individual portions of the area under observation, as well as video camera systems in which the strip-shaped portion under observation corresponds to matching image portions of the video image recorded from the area under observation.

In this manner, objects that appear in the area under observation can be detected reliably at relatively low expense. It is also possible to distinguish between objects that are at rest or oncoming and objects that are moving in the direction of travel of the vehicle. In particular, overtaking vehicles that enter the area under observation can be distinguished from stationary objects outside the lane and from oncoming vehicles. The separate time-resolution evaluation of various portions of the area under observation also provides the necessary conditions for flexible application of the object detection device to other purposes, such as finding parking spaces and special detection of vehicles changing from behind the vehicle to a passing lane.

In one embodiment of the invention, the object detection device is designed so that it can be used advantageously for detecting and measuring parking spaces. For this purpose, when the vehicle speed is below a presettable threshold value, the object detection device is automatically switched to the corresponding parking space detection mode. An associated flasher signal is switched on. In this particular mode, the portion under observation with horizontal components that are essentially parallel to the transverse direction of the vehicle is scanned. Moreover, the area under observation is preferably not scanned in this operating mode, keeping energy consumption and data processing cost low. The scanning information from this scanning strip, which extends in a horizontal plane essentially perpendicularly to the travel direction, can be used to detect parking spaces between standing vehicles which the vehicle passes and to determine the size of such parking spaces, for which purpose the evaluation unit evaluates this scanning information appropriately.

In another embodiment of the invention, the object detection device is designed so that overtaking vehicles entering the area under observation can be distinguished depending on whether they have already been in the passing lane for a long period of time or whether they have just pulled out into the passing lane from behind the vehicle, especially from its wake. The latter situation represents an increased danger potential which can be specifically detected with this embodiment. For this purpose, the portions under observation have a limited range between approximately 3 meters and 20 meters, preferably approximately 5 meters, and have a pattern with horizontal components that extends fanwise from the vehicle in such fashion that at least one strip-shaped portion with predominantly rearward components extends laterally over the vehicle for less than the vehicle width.

With this improvement, reliable recognition of an increased danger situation can be provided in which a following vehicle suddenly pulls out from behind the vehicle itself, i.e. from its wake. In this case, initially the scans associated with the portion that faces primarily rearward respond before the scans of the portions extending further laterally respond successively. These scans respond in succession according to the fanwise structure of the portion of the area under observation. On the other hand, the portion facing primarily rearward does not respond to a vehicle approaching from farther back in the passing lane, since it extends only slightly laterally over the vehicle itself and not mainly into the area of the passing lane, so that these two passing situations can be distinguished reliably.

Other objects, advantages and novel features of the present invention will become apparent from the following detailed description of the invention when considered in conjunction with the accompanying drawings.

DETAILED DESCRIPTION OF THE INVENTION

Figure 1:
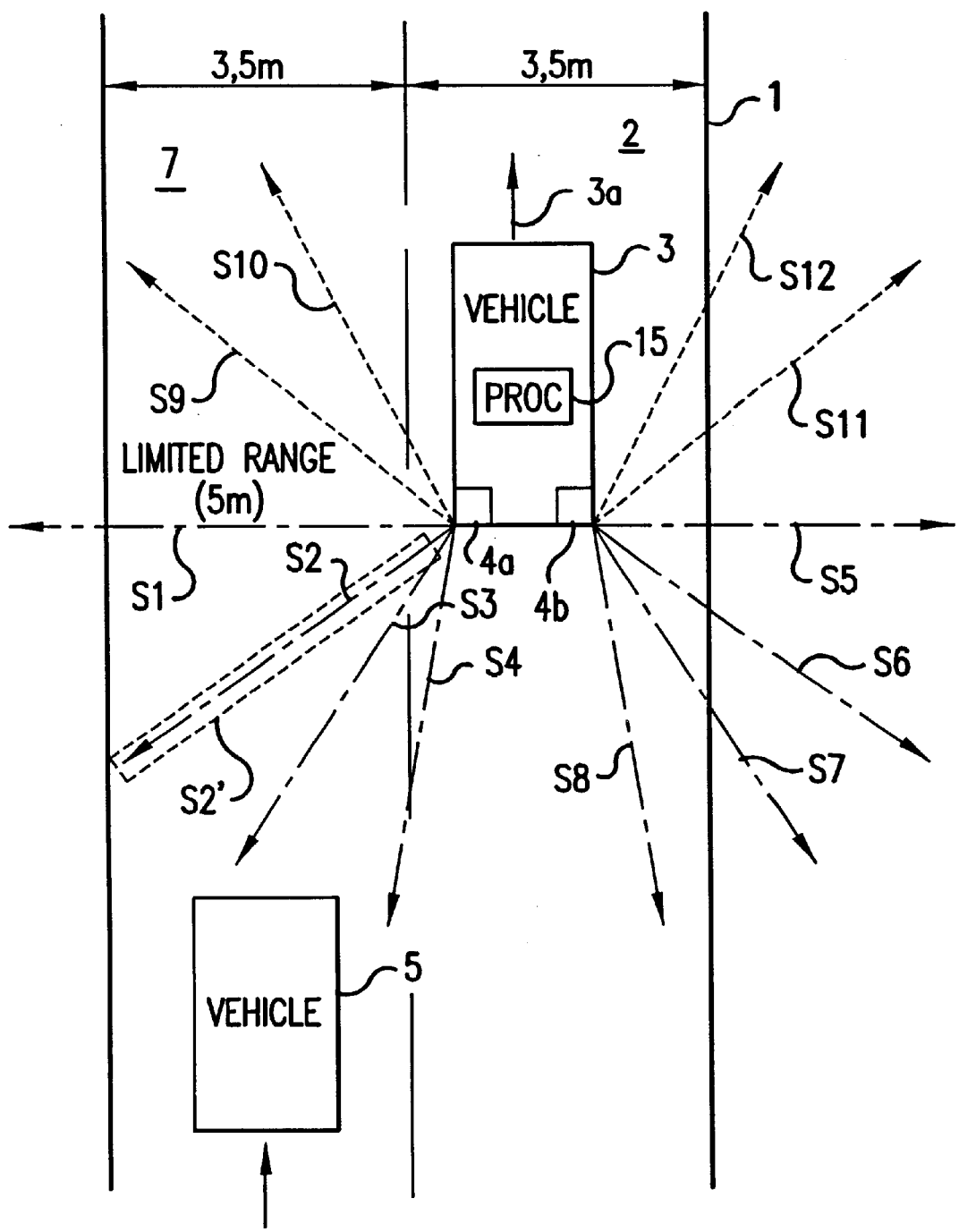
FIG. 1 is a schematic top view of a lane with a vehicle having an object detection device according to the invention.

FIG. 1 shows a portion of a two-lane road 1 in whose right lane 2 there is a motor vehicle 3 (shown schematically), for example an automobile equipped with an object detection device. The object detection device incorporates scanning means in the form of transceivers 4a,4b in the left and right rear areas of the vehicle. These transceivers can be integrated into a tail light positioned there, for example. The transceivers 4a,4b use infrared radiation. Each of these two units 4a, 4b transmits fanwise essentially horizontally, four infrared measuring beams S1, S2, S3, S4 and S5, S6, S7, S8 which scan corresponding strip shaped portions within, a specified range of approximately 5 meters into the respective lateral rear area. (For simplicity, only one such corresponding strip shaped portion S2' is depicted, schematically, in FIG. 1 of the drawing.) The measuring beams S1, S5 located farthest laterally are approximately parallel to the transverse direction of the vehicle, while the measuring beams S4, S8 that are radiated farthest rearward include only a small angle of approximately 10 degrees to the lengthwise direction of the vehicle (the travel direction 3a). As a result, they extend laterally only approximately for half the vehicle width over the vehicle 3. The two other measuring beams S2, S3 and S6, S7 are located at constant angle intervals between these two outer measuring beams S1, S4 and S5, S8, so that the area under observation, scanned with zero contact by means of infrared radiation by the respective transceivers, is formed by the sector delimited by the two outer measuring beams S1, S4 and S5, S8.

In FIG. 1, two additional measuring beams S9, S10 and S11, S12 of each transceiver 4a,4b are also indicated by dashed lines, which can be optionally provided and expand the area under observation by an area directed laterally forward. The emission of such additional measuring beams S9 to S12 with a forwardly directed component proves to be especially advantageous for prompt recognition of traffic signs and similar objects standing at the edge of the road. As a rule, such traffic signs are erected with a sign surface that is approximately perpendicular to the lengthwise direction of the road. Such signs therefore offer a small reflecting area for the lateral measuring beam components.

While the lateral measuring beam components deliver only a weak recognition signal for such traffic signs, the signs can be detected by the forward components of the optional measuring beams S9 to S12 with improved recognition reliability, with the forward components striking their broad front surfaces. The range of these measuring beams S9 to S12 that are emitted laterally forward is selected for this purpose in such fashion that they project a short distance over the edge of lane 2 traveled by vehicle 3; see the two measuring beams S11 and S12 in FIG. 1. In addition, these optional measuring beams S9 to S12, which can be in the form of infrared or radar beams for example, like the other measuring beams S1 to S8, contribute to the function of the object detection device, as explained in detail below.

It is understood that as an alternative to this example, additional measuring beams and/or additional transceivers can be provided at other points on the vehicle. As an alternative to using infrared systems, systems can be used that operate with a different kind of electromagnetic radiation or with acoustic waves, such as optical systems that use visible light, including video camera systems, radio wave systems, ultrasound systems, radar systems, or combinations of such systems, for example combined radar and infrared systems. It is important in all cases that the systems be so designed that the scanning information from several portions of the monitored area under observation, primarily the scanning information from the individual measuring beams S1 to S8, is detected separately. With a video camera system, this can be done by selecting suitable strip-shaped image sections.

In the existing infrared system as well as in other sound and radar systems, the portions are preferably each designated by their own measuring beams, so that depending on the application, any number of measuring beams or portions of the area under observation can be provided. In another alternative system design, instead of the indicated, relatively well-collimated, largely horizontal infrared measuring beams, beam bundles with conical or flat, curtain-like characteristics that have a vertical component can be used. In such cases, it is only important that the horizontal components of the portions of the area under observation thus formed be offset with respect to one another in the direction of travel of the vehicle or inclined differently relative to this direction. In addition, the range of the scanning system used in each case may be chosen as desired. A relatively short range between approximately 3 meters and approximately 20 meters is advantageous for the application of primary interest in the present case.

Figure 5:
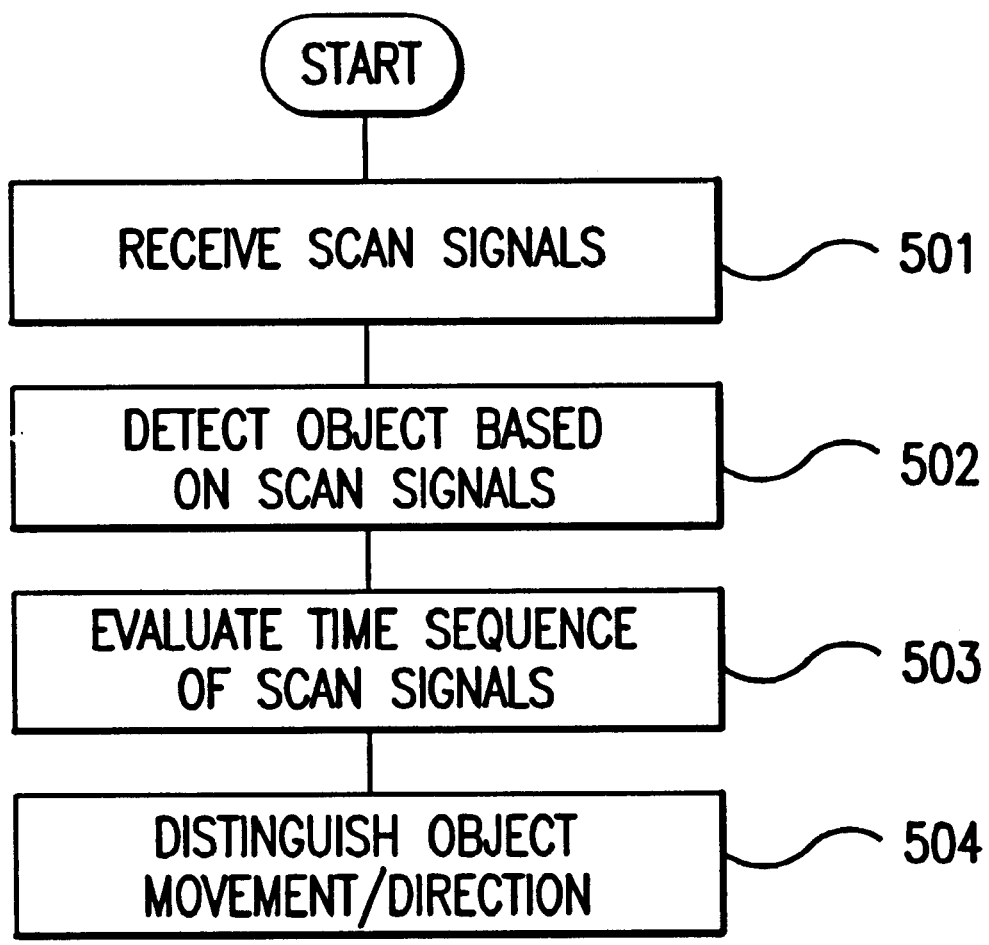
FIG. 5 is a flow chart which illustrates processing to distinguish object movement.

A suitable evaluation unit 15 in the form of a conventional processing unit is associated with the scanning means 4a, 4b in a conventional manner. As shown in FIG. 5 the evaluation unit 15 receives the output signals from scanning means 4a, 4b (step 501). The scanning information contained in these output signals from the individual measuring beams S1 to S8 is evaluated separately and with time resolution by the evaluation unit. Object detection (step 502) takes place in the evaluation unit 15 using conventional methods such as reflection and/or travel time measurement and/or triangulation and/or video image evaluation. By means of the evaluation unit, therefore, the object detection device detects when an object is located in or enters a given area under observation.

FIG. 1 illustrates the case of blind spot monitoring in which, with transceiver 4a switched on, a vehicle 5 approaching in a passing lane 7 is detected in the left rear corner area of the vehicle as soon as it enters the corresponding area under observation that forms the blind spot which the driver can see poorly. Characteristically, the evaluation unit 15 determines from the time-resolved evaluation of the scanning information the response sequence of the individual measuring beams S1 to S4 and S5 to S8 in the case of an object that appears (step 503). From this information, it not only detects and reports the presence of an object, but also draws additional conclusions as described below (step 504).

Figure 2:
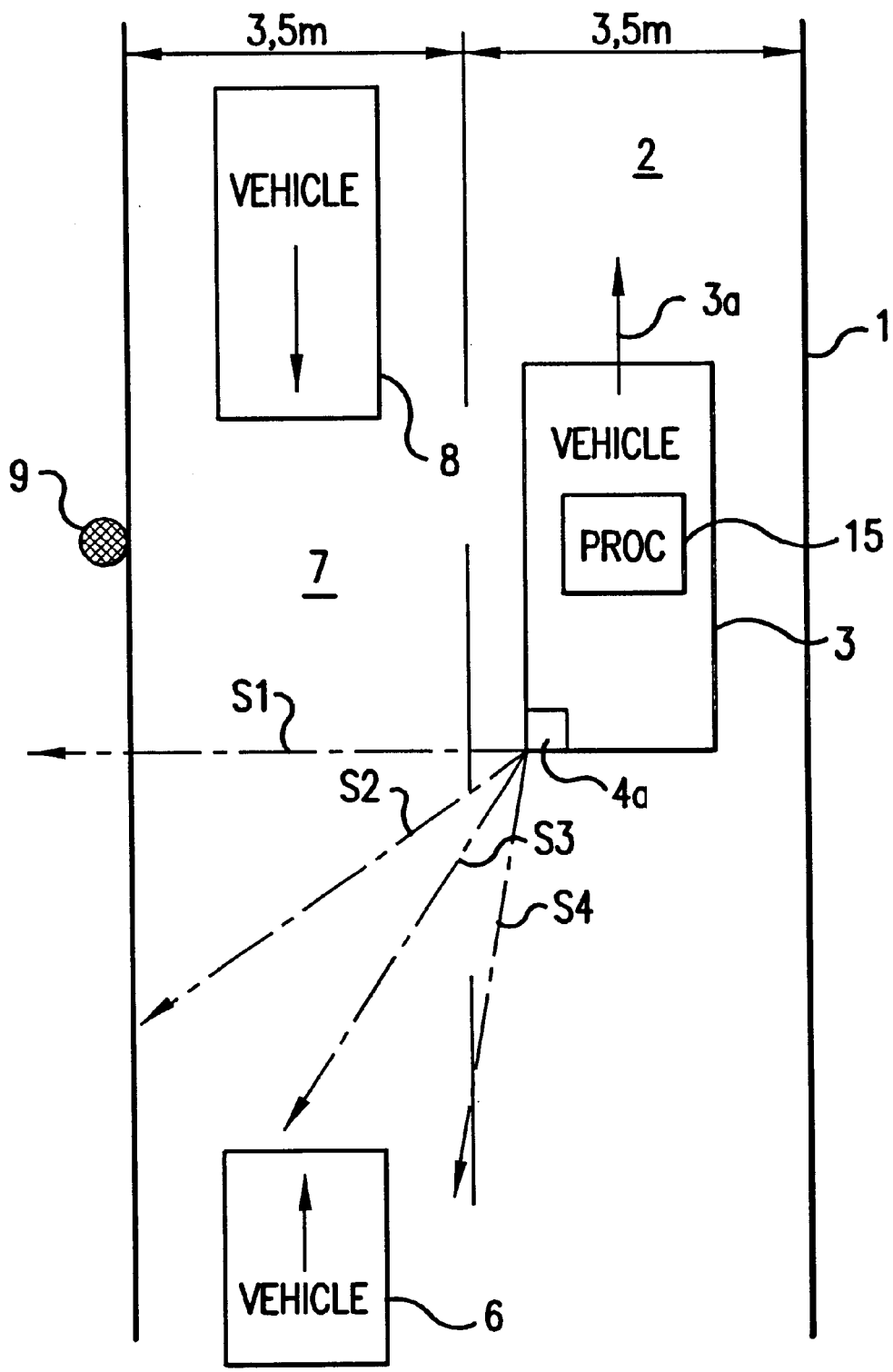
FIG. 2 is a view similar to FIG. 1, which illustrates the difference between overtaking and oncoming vehicles as determined by the object detection device.

FIG. 2 illustrates the ability of an object detection device to distinguish overtaking vehicles from standing objects or vehicles and from oncoming vehicles. As can be seen from FIG. 2, when an overtaking vehicle 6 has moved from behind vehicle 3 traveling in the right-hand lane 2 into the passing lane 7 and enters the blind spot under observation, the measuring beams S1 to S4 of the transceiver 4a in question respond in sequence. That is, initially the measuring beam S3 (that extends farthest backward into passing lane 7) responds, followed in succession by the laterally emitted measuring beams S2 and S1. The measuring beam S4 emitted farthest rearward in this case does not respond since it does not extend sufficiently far into passing lane 7.

In contrast to this response sequence S3-S2-S1, in the case of an oncoming vehicle 8 in left lane 7 (also shown in FIG. 2), a reverse response sequence S1-S2-S3 takes place. In other words, the measuring beam S1 that is radiated farthest laterally responds first, followed in succession by the measuring beams S2 and S3 that are emitted increasingly rearward. When the optional measuring beams S9 to S12 emitted with a forward component are used (these beams are shown only in FIG. 1 for the sake of simplicity), even earlier detection of the oncoming vehicle 8 is clearly made possible. The measuring beams S10 directed farthest forward responds first and then the measuring beam S9 that is directed laterally and forward to a lesser degree, and finally the measuring beams S1 to S3 respond in the sequence given.

A similar response sequence is obtained in the case of vehicles that might be parked at the edge of the road in left lane 7 as well as for a standing object 9 located off road 1 in the vicinity of the edge of the road, for example a light pole, a traffic sign, or a guard rail. With suitable system design, such standing objects can be distinguished from vehicles located in left lane 7 by virtue of the fact that they are no longer detected by the three abovementioned measuring beams S1, S2, S3 but at most by the measuring beam S1 that extends to the greatest degree laterally or in any case additionally by the measuring beam S2 adjacent to the latter. In the same way, vehicles in a possible third lane can be detected or filtered out depending on the chosen range of the scanning means.

The response sequence used by the evaluation unit makes it possible to distinguish standing objects and oncoming vehicles that enter the area under observation from significant overtaking vehicles and to filter them out of further evaluation. This can be used only when an overtaking vehicle is detected that generates a corresponding passing warning without falsely producing such a warning of oncoming vehicles, parked vehicles, or standing objects off the road.

Figure 3:
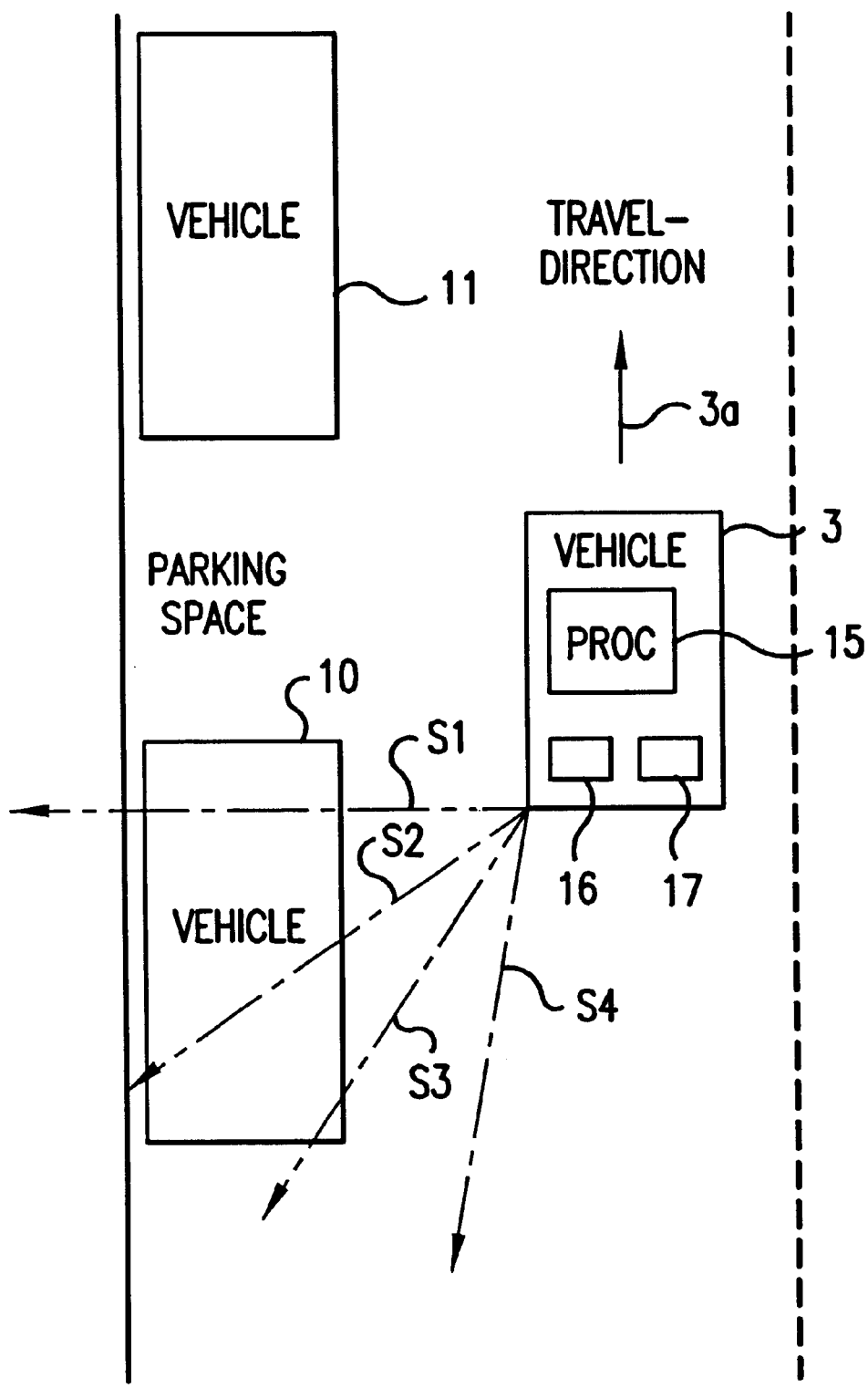
FIG. 3 is a view similar to FIG. 1 illustrating a parking space detection mode of the object detection device.
Figure 6:
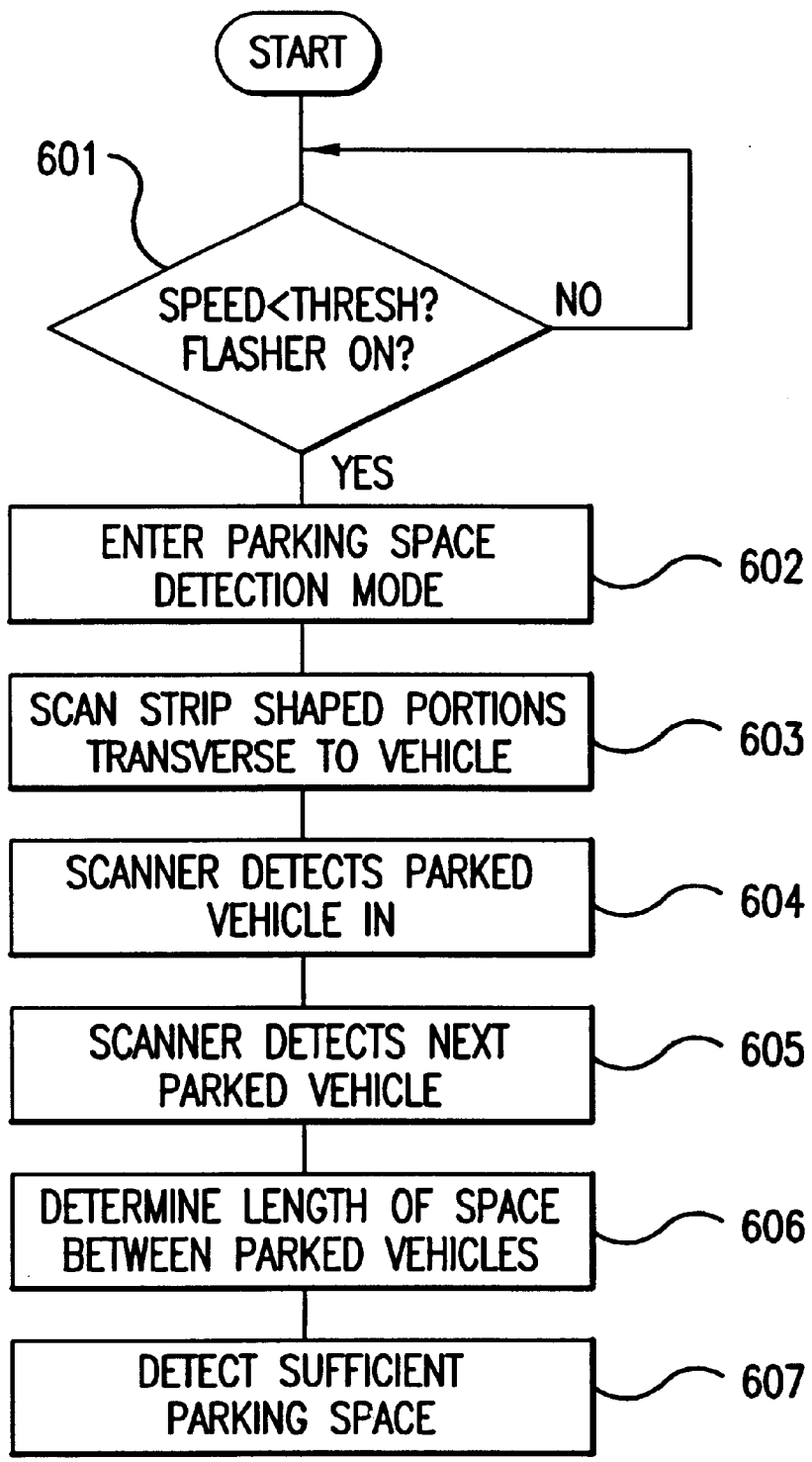
FIG. 6 is a flow chart which illustrates processing to detect a parking space.

FIGS. 3 and 6 illustrates the ability of the object detection device to detect parking spaces and to determine their size. The object detection device can automatically enter into a parking space detection mode which is activated when the vehicle speed is below a certain threshold 16 and a flasher signal 17 has been triggered on the corresponding side of the vehicle (FIG. 6, steps 601,602). Specifically, only the transceiver 4a located on this side is activated. For additional reduction of energy consumption and data, preferably only the measuring beam S1 that is emitted primarily laterally is activated (step 603) and/or only the output signal associated with this measuring beam S1 is evaluated by the evaluation unit 15. When vehicle 3 passes two spaced parked vehicles 10,11 the object detection device therefore detects the presence of a parking space between the vehicles by means of the related measuring beam S1. From the vehicle speed and the period of time until measuring beam S1, after leaving one parked vehicle 10 (step 604), strikes the next parked vehicle 11 (step 605), the evaluation unit determines the length of the parking space (step 606) and can then decide whether it is sufficient for parking vehicle 3 (step 607). Of course, alternatively or in addition to the illustrated automatic activation of this parking space detection mode, provision can also be made to activate it manually.

Figure 4:
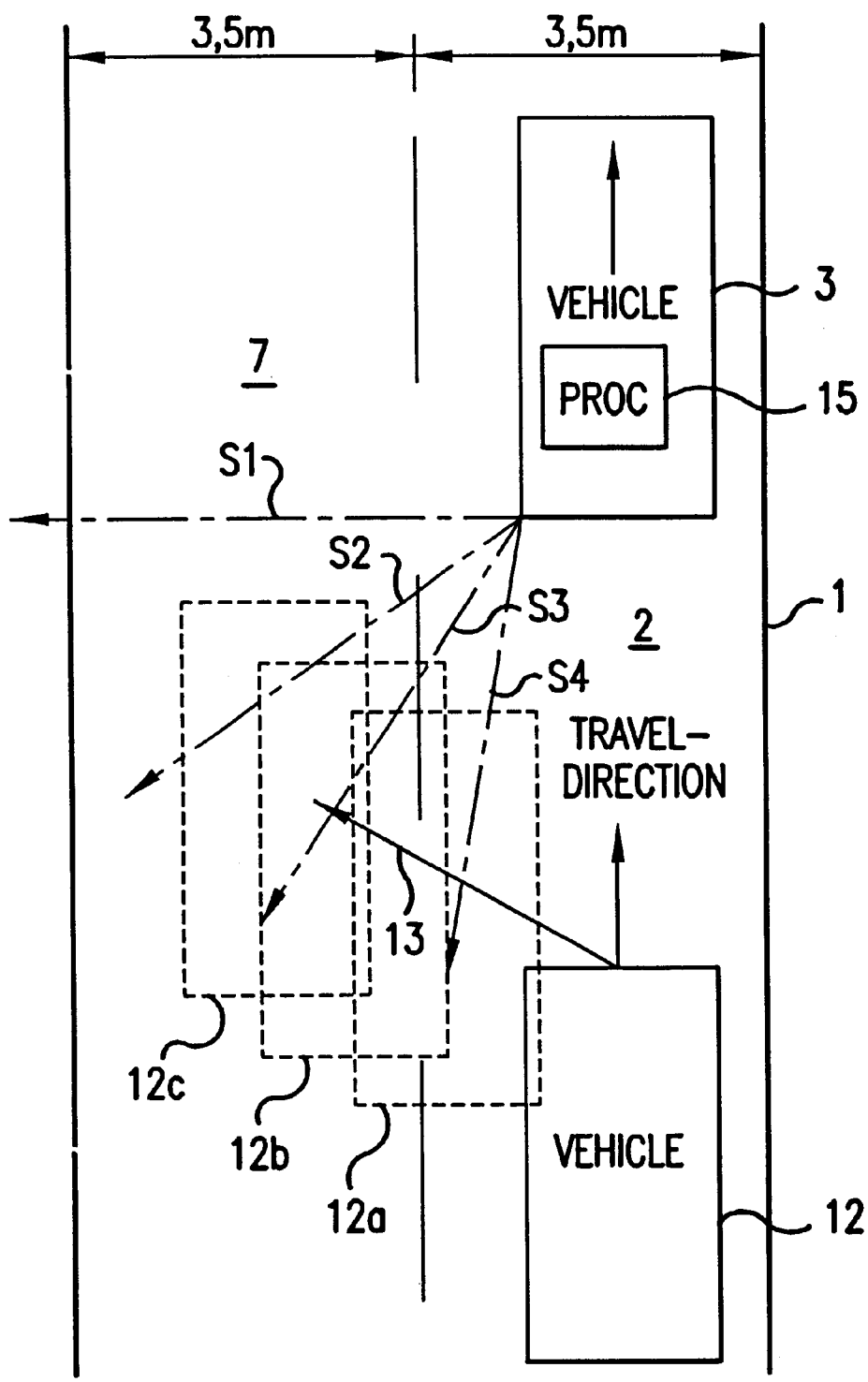
FIG. 4 is a view similar to FIG. 1 illustrating the detection by the object detection device of a vehicle emerging from the wake.

FIG. 4 illustrates the additional ability of the object detection device to detect the emergence of a vehicle 12 located in the wake of vehicle 3 from its lane 2 into the passing lane 7 and to distinguish from the case in which a vehicle has been approaching vehicle 3 for a long time in passing lane 7, as is the case for the overtaking vehicle 6 shown in FIG. 2. As can be seen from FIG. 4, when the vehicle 12 that has been following close behind vehicle 3 in its wake pulls out into the passing lane 7, the measuring beam S4 that is emitted farthest rearward responds before the other measuring beams S1 to S3. As overtaking vehicle 12 moves out increasingly diagonally forward from the wake of vehicle 3, it successively assumes the positions 12a, 12b, and 12c shown in dashed lines in order then to overtake vehicle 3. As a result, the response sequence S4-S3-S2-S1 is obtained for the four measuring beams S1 to S4. This differs from the response sequences in the other traffic situations explained above. In particular, the case of an overtaking vehicle emerging from the wake according to FIG. 4 can be distinguished reliably in this way from the case of a vehicle previously approaching in the passing lane as shown in FIG. 2. In the former case, only the measuring beam S4 that extends farthest backward responds. This can be used for the case in which overtaking from the wake as shown in FIG. 4 is detected by the object detection device. The device then emits a corresponding warning which differs from that in the other overtaking case, preferably by an elevated degree of warning to signal increased danger.

From the above description of advantageous examples it is clear that the vehicle according to the invention has an object detection device which can be produced at relatively low cost and is able to perform a plurality of functions such as specific detection of an overtaking vehicle located in the blind spot, classifying the degree of danger when overtaking maneuvers are detected, and emitting warnings that differ as a function of the level of danger, filtering out standing objects such as guard rails, traffic signs, light poles, and parked vehicles, distinguishing between overtaking and oncoming vehicles, detecting and determining the size of parking spaces, and filtering out vehicles located in a third or other lane.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Vehicle with an object detection device for detecting objects in an area adjacent the vehicle, comprising:
   scanner means for radiation-based scanning of strip shaped portions of said area; and
   an evaluation unit connected to the scanner means; wherein
   the evaluation unit evaluates a time sequence of scanning information from the scanner means for at least two strip-shaped portions of said area, said at least two strip shaped portions having horizontal components that are at least one of inclined differently to a lengthwise direction of the vehicle and offset with respect to one another in the lengthwise direction of the vehicle; and on the basis of a response sequence for said at least two strip shaped portions, the evaluation unit distinguishes objects moving in a travel direction of the vehicle from objects that are at rest or oncoming.

2. Vehicle according to claim 1, wherein:

the object detection device automatically enters to a parking space detection mode if the vehicle speed is below a given threshold value and a flasher signal is activated;

in the parking space detection mode, triggering the evaluation unit causes scanning of at least a portion of said area that extends substantially transversely to the lengthwise direction of the vehicle; and the evaluation unit evaluates scanning information for the presence of a parking space, and for its size.

3. Vehicle according to claim 1 wherein:

said strip shaped portions of said area have a range of between approximately 3 meters and approximately 20 meters; and said strip shaped portions have horizontal components extending fanwise from vehicle, with the horizontal components of least one portion extending laterally at most by approximately half a vehicle width beyond the vehicle.

4. An object detection device for a vehicle, comprising:

a scanner arrangement for radiation based scanning of an area adjacent the vehicle, said scanning arrangement comprising a plurality of scanners, each of which scans a different elongate portion of said area, each said elongate portion having a horizontal longitudinal axis which is at least one of inclined differently from other elongate portions relative to a lengthwise direction of the vehicle, and offset relative to the other elongate portions in the lengthwise direction of the vehicle; and an evaluation unit connected to the scanner arrangement to receive time sequence scanning information from each scanner concerning objects detected in an area which it scans;

wherein said evaluation unit evaluates said time sequence scanning information from at least two scanners and distinguishes objects moving in a travel direction of the vehicle from objects which are at rest or oncoming, based on a response sequence of signals from said at least two sensors.

* * * * *